(12) United States Patent
Lahijani

(10) Patent No.: US 6,579,942 B2
(45) Date of Patent: *Jun. 17, 2003

(54) MELT-FABRICABLE POLYTETRAFLUOROETHYLENE

(75) Inventor: Jacob Lahijani, Wilmington, DE (US)

(73) Assignee: E. I. du Pont de Nemours and Company, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 09/804,571

(22) Filed: Mar. 12, 2001

(65) Prior Publication Data

US 2001/0016625 A1 Aug. 23, 2001

Related U.S. Application Data

(63) Continuation of application No. 09/094,935, filed on Jun. 15, 1998, now Pat. No. 6,265,492.

(51) Int. Cl.⁷ ............................................... C08L 27/18
(52) U.S. Cl. ........................ 525/151; 525/133; 525/153
(58) Field of Search ................................. 525/151, 153, 525/133

(56) References Cited

U.S. PATENT DOCUMENTS 4,952,636 A * 8/1990 Morgan ....................... 525/276

FOREIGN PATENT DOCUMENTS

| DE | 196 19 232 A1 | 11/1997 | ........... B29B/11/08 |
| EP | 0 192 397 A1 | 8/1986 | ........... C08L/71/00 |
| EP | 0 611 384 B1 | 1/1999 | ........... C08L/27/12 |
| EP | 0 893 471 A1 | 1/1999 | ........... C08L/27/12 |

* cited by examiner

*Primary Examiner*—Patricia A. Short

(57) ABSTRACT

Melt fabricable compositions of at least 50 wt % polytetrafluoroethylene are provided, wherein the composition contains polyaryletherketone and optionally part of the polytetrafluoroethylene is PTFE micropowder.

7 Claims, No Drawings

MELT-FABRICABLE POLYTETRAFLUOROETHYLENE

This application is a continuation of Ser. No. 09/094,935 filed Jun. 15, 1998, now U.S. Pat. No. 6,265,492.

FIELD OF THE INVENTION

This invention relates to polytetrafluoroethylene compositions and the fabrication of articles therefrom.

BACKGROUND OF THE INVENTION

Polytetrafluoroethylene (PTFE) is known for its non melt-fabricability, i.e. it has a melt viscosity which is so high, e.g. at least $10^8$ Pa·s at 380° C., that it does not flow in the molten condition. Consequently, the PTFE cannot be fabricated by the usual melt-fabrication process of extrusion, including injection molding. Instead, fabrication processes have been developed which do not involve melt flow. For the fine powder type of PTFE, wherein the PTFE is fibrillatable when subjected to shear, the PTFE is paste extruded, which is a low temperature (less than 75° C.) extrusion process carried out on a mixture of the fine powder type of PTFE and lubricating oil. The granular type of PTFE is fabricated by compression molding, which involves filling the mold with cold granular PTFE, and then subjecting it to compression by a ram and heating to form the molded article. Among the problems associated with paste extrusion is the need to remove the lubricant after paste extrusion. Compression molding of granular PTFE is limited to simple shapes. Neither type of PTFE is injection moldable, whereby when intricate shapes of the PTFE are desired, they have to be machined from compression molded blocks of PTFE.

SUMMARY OF THE INVENTION

The present invention provides polytetrafluoroethylene compositions which are melt fabricable by extrusion and thus by injection molding. The composition comprises at least 50 wt % polytetrafluoroethylene, at least 20 wt % of which has a melt viscosity of at least $10^8$ Pa·s, and the remainder polyaryleneetherketone, to total 100 wt % of the combination of these two resins.

When extruded in the molten form, the composition has a matrix of PTFE and the polyaryleneetherketone is dispersed therein as fine particles (domains) which solidify from the melt. Thus, molded articles of the melt-fabricated composition have much of the characteristics of PTFE, e.g. high service temperature, chemical inertness, and lubricity (low friction). As will be explained hereinafter, the composition can contain at least 90 wt % of the PTFE, which furthers the attributes of the molded article being like pure PTFE.

DETAILED DESCRIPTION OF THE INVENTION

The polyaryleneetherketone is a well known family of resins which includes polyetherketone having the repeat unit

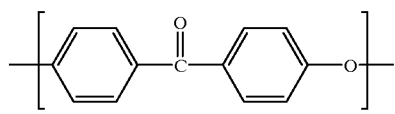

polyetheretherketone having the repeat unit

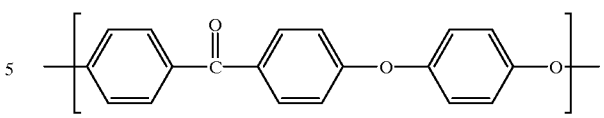

and polyetherketoneketone having the repeat unit

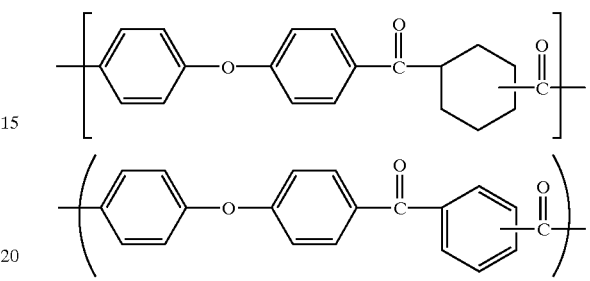

wherein the arylene group between the ketone groups of the polyetherketoneketone is typically a mixture of para- and meta-arylene groups, derived for example from isophthalyl and terephthalyl halides, present in the repeat units making up the resin. These resins are commonly known as PEK, PEEK, and PEKK, respectively, and are disclosed in one or more of the following U.S. Pat. Nos. 3,065,205, 3,441,538, 3,442,857, 5,357,040, 5,131,827, 4,578,427, 3,516,966, 4,704,448, and 4,816,556. The polyaryletherketones typically have a melting point which is at least 300° C. and high molecular weight, high strength and high modulus characteristic of engineering plastics. The inherent viscosity of the resin can for example be at least 0.4 measured on a 0.5 wt % solution in concentrated sulfuric acid at 30° C. PEKK is preferred because it can have low melt viscosity and slow crystallization, which facilitates mixing of the resin with the PTFE and providing melt flowability to the resultant composition. PEKK typically contains units derived from both terephthalyl (T) and isophthphalyl (I) halide in a ratio of 90:10 to 30:70, and more typically 80:20 to 60:40. As the proportion of T units decrease and I units increase, the crystallinity of the PEKK diminishes, until at 60:40, the PEKK crystallizes so slowly that it resembles an amorphous polymer except that it will exhibit a melting point. The present invention is applicable to all of the polyaryleneetherketone resins, i.e. they all impart melt-fabricability to the PTFE.

The PTFE is also a well known resin. The fine powder type is preferred and this type is prepared by aqueous dispersion polymerization. The resultant PTFE fine powder type is a fibrillatable resin. A non-fibrillatible, non-melt-fabricable PTFE resin, which is also prepared by aqueous dispersion polymerization as disclosed in U.S. Pat. No. 4,952,636 can also be used in the present invention. The PTFE can be homopolymer of tetrafluoroethylene or can be modified homopolymer, i.e. containing a small amount, e.g. less than 0.5 mol %, of copolymerized monomer which improves the film forming property of the resin, such as disclosed in U.S. Pat. No. 3,142,665. The PTFE will generally have a melt viscosity of at least $10^8$ Pa·s at 380° C.

The PTFE and PEKK components can be melt blended as part of the extrusion process or can be premixed, followed by melt blending at temperature at which at least the polyaryleneetherketone is molten. In the case of injection molding, preferably the composition is first melt blended, using for example a twin screw extruder equipped with high shear screws, and formed into molding granules (pellets), followed by injection molding, which procedure promotes uniformity in the dispersion of polyaryleneetherketone domains within the PTFE matrix. Generally, the melt blending temperature will be at least 350° C. Under this condition, the polyaryleneetherketone fluidizes the composition and becomes uniformly dispersed as fine molten domains in the PTFE component, enabling the composition to be melt extruded. The resultant extrudate can be the final molded article, such as in the case of an injection molded article or an extruded tube, sheet or coating, or can be chopped into molding granules for subsequent melt processing into the article desired. The presence of the polyaryleneetherketone component as discrete particles (domains) within the PTFE matrix indicates the incompatibility between the two resins. Nevertheless, articles molded from compositions of the present invention have good properties An amount of the polyaryleneetherketone which is effective to impart melt-extrudability to the composition while maintaining the PTFE as the matrix phase when molded is present in the composition. When the PTFE is the fine powder type, as little as about 20 wt % of the composition can be the polyaryleneetherketone is needed to impart melt fabricability to the resultant composition, whereby the composition will contain 20 to 50 wt % of the polyaryleneetherketone, preferably 20 to 30 wt %. The wt % of the components are based on the total weight of the PTFE and polyaryletherketone components unless otherwise indicated herein.

It has also been discovered that the amount of polyaryleneetherketone in the composition can be reduced while retaining melt fabricability. The addition of PTFE micropowder to the composition enables this result to be achieved such that as little as about 4 wt % of the polyaryletherketone is all that is necessary for imparting melt extrudability to the composition, the 4 wt % being based on the combined weight of the PTFE and polyaryletherketone components. In this embodiment, the PTFE component comprises both the high melt viscosity (non-melt-fabricable) PTFE and the PTFE micropowder. The PTFE micropowder is not merely a fine powder of PTFE. Instead, PTFE micropowder is a tetrafluoroethylene homopolymer or modified homopolymer which has a considerably lower molecular weight than the normal high melt viscosity PTFE, e.g. the PTFE fine powder described above, which enables the micropowder by itself to be melt flowable, the melt viscosity of the micropowder being 50 to $1 \times 10^5$ Pa·s as measured at 372° C. in accordance with the procedure of ASTM D-1239-52T, modified as disclosed in U.S. Pat. No. 4,380,618. Preferably the melt viscosity of the PTFE micropowder is 100 to $1 \times 10^4$ Pa·s at 372° C. PTFE micropowder is described further in Kirk-Othmer, The Encyclopedia of Chemical Technology, 4th Ed., pub. by John Wiley & Sons (1994) on pp 637–639 of Vol. 11, and in the article H. -J Hendriock, "PTFE Micropowders", Kunstoffe German Plastics, 76, pp. 920–926 (1986). These publications describe the micropowder as being obtained by polymerization or by irradiation degradation of the high molecular weight (high melt viscosity) PTFE. Polymerization directly to the micropowder is disclosed for example in PCT WO 95/23829, wherein the micropowder is referred to as low melt viscosity PTFE. Although the PTFE micropowder is melt flowable, it is not melt fabricable by itself because the resultant product has no practical strength due to the low molecular weight of the PTFE micropowder. Thus, the beading obtained in the melt flow rate test from which the melt viscosity is determined is brittle such that it breaks upon the slightest flexure.

The PTFE micropowder when used, is preferably present in the composition in an amount which is effective to enable the amount of polyaryleneetherketone needed for melt fabricability of the PTFE composition to be reduced by at least 40%. Thus, with the presence of the micropowder, as little as 4 or 5 wt % of the polyaryleneetherketone may be all that is needed for melt fabricability of the composition by melt extrusion. At least about 10 wt % of the polyaryleneetherketone may be desired, to increase fluidity in the melt, for injection molding. When the PTFE is the fine powder type, the composition may contain 4 to 10 wt % polyaryleneetherketone and the remainder being the PTFE fine powder and the PTFE micropowder, the amount of the micropowder in each case being effective to make the composition melt-fabricable. When the PTFE micropowder is used in the composition its amount, will generally be from 20 to 80 wt % based on the combined weight of the micropowder and the PTFE (high melt viscosity), preferably 30 to 75 wt %, whereby at least 20 wt % of the high melt viscosity PTFE, based on total PTFE content, is present, preferably at least 25 wt %. Of course, the entire PTFE content of the PTFE/polyaryleneetherketone blend can be the high molecular weight PTFE.

The combination of the high melt viscosity PTFE and PTFE micropowder provides a fabricated article in which the two types of PTFE are an indistinguishable blend of PTFE resin forming the matrix for the dispersion of polyaryleneetherketone therein. The PTFE resin is highly thermally stable and strong, not being significantly affected by the presence of the polyaryleneetherketone and PTFE micropowder fraction of the PTFE resin.

The compositions of the present invention can contain other ingredients such as pigments for coloring the composition or fillers, such as mica, glass, carbon, or aramid, in fibrous or other particulate form. The polyaryleneetherketone aids in dispersing the filler in the PTFE matrix. When filler is present, the amount present will be 0.5 to 30 wt % based on the combined weight of PTFE and filler.

The melt extrusion of the compositions of the present invention can be carried out in the same manner as extrusion of melt-fabricable fluoropolymers such as TEFLON® PFA fluoropolymer resin (DuPont) into a wide variety of shapes, such as sheets, tubing, and coated substrate, such as insulation on wire. Similarly, injection molding can be carried out in the same way as injection molding of the PFA fluoropolymer, e.g. at temperatures of 330 to 370° C. PTFE fine powder is usually sintered after non-melt fabrication, except in the case of tape made from paste extruded fine powder. In the melt fabrication of compositions of the present invention, just the melt exposure in the fabrication process is all that is necessary to provide the molded article with the integrity desired. Subsequent sintering can be used if further strengthening is desired.

In the following Examples, blends of polyaryleneetherketone and PTFE are melt-fabricated into tensile test bars ("dog bone" shape, 8-½ in (21.6 cm) long, 0.5 in (1.27 cm) wide in the test region, and 0.125 in (0.32 cm) thick) using a 6 oz. (170 g) injection molding machine having the following temperature profile in the screw/ram chamber: rear=370°, center=380° C., and front=380° C. The screw speed was 120 rpm and the back pressure was 50 psi (0.35 Mpa). The mold temperature was about 110° C., and the mold cycle was 20 sec/20 sec. The PEKK resin used in the Examples is made by the process of U.S. Pat. No. 4,816,556 (Gay et al.).

EXAMPLE 1

In this Example, the PTFE was TEFLON® fluoropolymer resin grade 60 (DuPont) (melt viscosity greater than $1\times10^8$ Pa·s) and the polyaryleneetherketone was PEKK having a ratio of T and I units of 80:20, which by itself (test bars) has a tensile modulus of 530 ksi (3657 MPa). Note that 1 ksi=1000 psi. The PTFE and PEKK were dry blended, each component constituting 50% of the total blend, and then the blend was melt-blended in the injection molding machine, prior to injection into molded articles, including tensile test bars. Test bars of the blend exhibited a tensile modulus of 375 ksi (2588 MPa). The tensile modulus was tested using the procedure of ASTM D638 and this test procedure was used to obtain the other tensile modulus test results reported herein. This Example shows the melt-fabrication of PTFE in which the maximum amount of PEKK is present.

EXAMPLE 2

In this Example, the same PTFE and the same polyaryleneetherketone as used in Example 1 were used. In this Example, part of the PEKK was replaced by PTFE micropowder, notably ZONYL® fluoroadditive grade MP1600 (DuPont)(MFR 17 g/10 min, melt viscosity of $3\times10^3$ Pa·s at 372° C.). Injection molded test bars of the blend containing 20 wt % of the PEKK, 50 wt % of the PTFE and 30 wt % of the MP1600 exhibited a tensile modulus of 201 ksi (1387 MPa). Injection molded test bars of the blend containing only 10 wt % of the PEKK, 30 wt % of the PTFE, and 60 wt % of the MP1600 exhibited a tensile modulus of 283 ksi (1953 MPa). The combination of the fluoropolymers (PTFE and MP1600) constituted 80 and 90 wt % of these blends, respectively, giving them high fluoropolymer character, but having the advantage of melt-fabricability. Test bars molded from MP1600 by itself have no tensile modulus in that they break when gripped by the tensile test mchine clamps, the low strength being attributible to the low molecular weight of this PTFE micropowder. Surprisingly, the presence of the MP1600 in the blend does not destroy the tensile strength of the blend. Even more surprisingly, the blend with the greater amount of the MP1600 had the higher tensile modulus. Test bars of the PTFE could not be injection molded by itself, because the high melt viscosity of this resin prevents such melt fabrication. Comparable test bars made by skiving from a sintered block of the PTFE gave a tensile modulus of 80 ksi (552 MPa).

EXAMPLE 3

The PTFE used in this Example was the same as in Example 1 and the polyaryleneetherketone used was PEKK composed of T and I units in a 60:40 wt ratio. The PEKK also contained 10 wt % of $TiO_2$ pigment and had a tensile modulus of 495 ksi (3416 MPa). Test bars of a blend of 20 wt % of the PEKK/$TiO_2$ blend, 30 wt % of the PTFE and 50 wt % of the MP1600 exhibited a tensile modulus of 249 ksi (1718 MPa).

What is claimed is:

1. Composition comprising at least 50 wt % of fibrillatible polytetrafluoroethylene having a melt viscosity of at least $10^8$ Pa·s, said polytetrafluoroethylene having been prepared by aqueous dispersion polymerization, and an effective amount of polyaryleneetherketone to impart melt fabricability to said composition.

2. The composition of claim 1 wherein said composition contains 20 to 50 wt % of said polyaryleneetherketone.

3. Process comprising melt extruding the composition of claim 1.

4. Process of claim 3 wherein said melt extruding includes injection molding.

5. Composition comprising at least 50 wt % of fibrillatable polytetrafluoroethylene having a melt viscosity of at least $10^8$ Pa·s, said polytetrafluoroethylene having been prepared by aqueous dispersion polymerization, and an effective amount of polyetherketoneketone to impart melt fabricability to said composition.

6. The composition of claim 5 wherein said composition contains 20 to 50 wt % of said polyetherketoneketone.

7. Melt blended composition comprising at least 50 wt % of polytetrafluoroethylene having a melt viscosity of at least $10^8$ Pa·s, said polytetrafluoroethylene having been prepared by aqueous dispersion polymerization, and an effective amount of polyaryleneetherketone to impart melt fabricability to said composition, said polytetrafluoroethylene forming the matrix of said composition and said polyaryleneetherketone being dispersed in said matrix.

* * * * *